Dec. 15, 1925.  1,565,832
E. E. WATERMAN
TRACTOR DRAW BAR STRUCTURE
Filed July 31, 1924
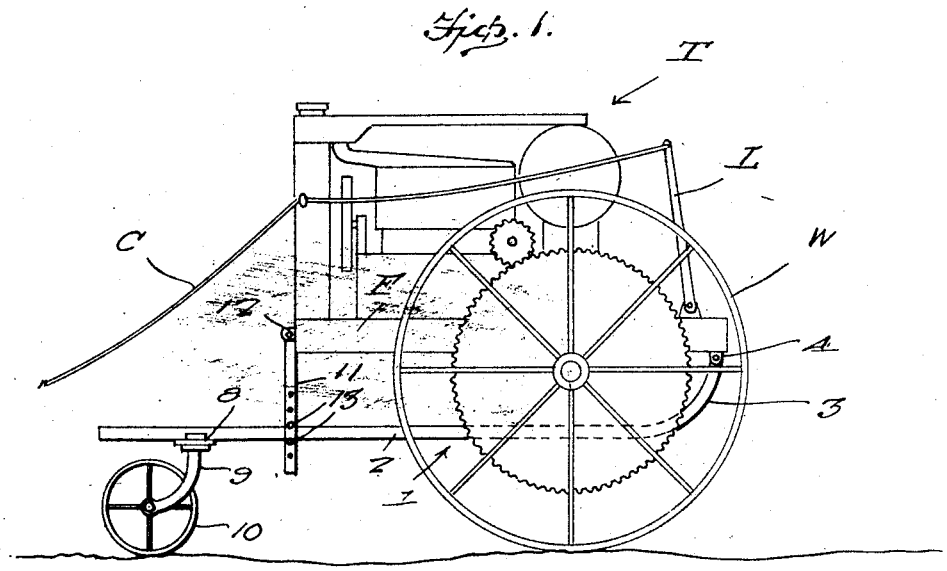
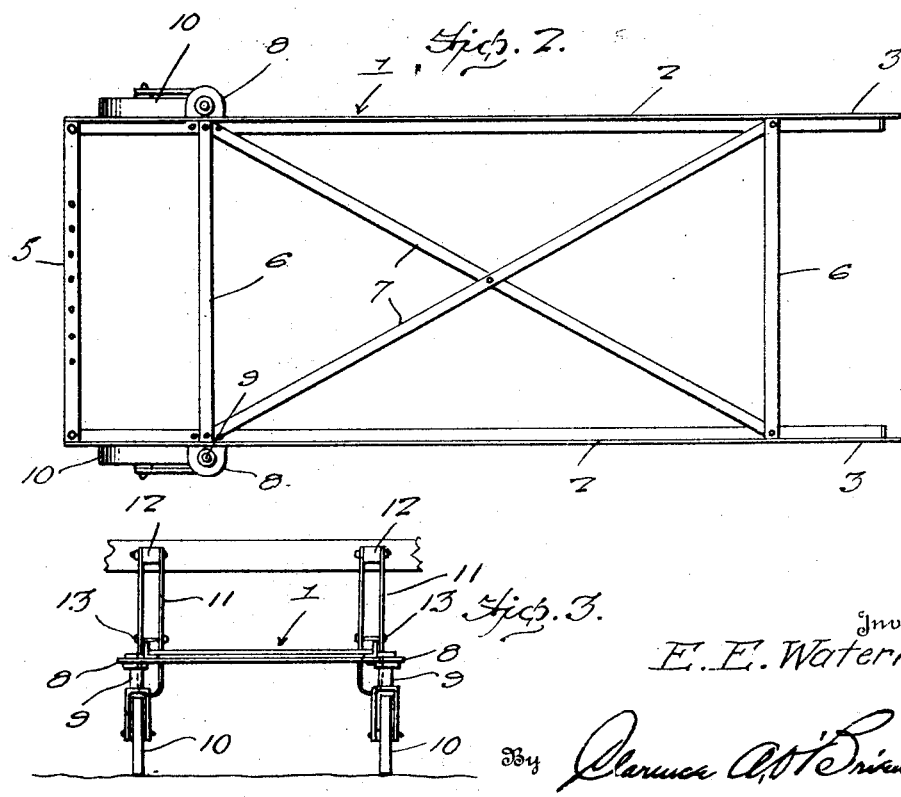
Inventor
E. E. Waterman
By Clarence A. O'Brien
Attorney Patented Dec. 15, 1925.

1,565,832

UNITED STATES PATENT OFFICE.

ELMER E. WATERMAN, OF REMUS, MICHIGAN.

TRACTOR DRAWBAR STRUCTURE.

Application filed July 31, 1924. Serial No. 729,325.

*To all whom it may concern:*

Be it known that I, ELMER E. WATERMAN, a citizen of the United States, residing at Remus, in the county of Mecosta and State of Michigan, have invented certain new and useful Improvements in Tractor Drawbar Structures, of which the following is a specification.

This invention relates to an improved draw bar structure for tractors.

In carrying out the invention, it is my aim to provide a structure which is capable of being applied to one of the forms of conventional tractors, the structure being such as to produce effective traction at all times whether or not an inclined grade is being ascended or descended.

More specifically speaking, I propose to provide a draw bar structure, which exerts a downward pull on the forward end of the frame of the tractor, when the latter is travelling upwardly on a hill or the like, whereby to exert a downward thrust on the traction wheels to afford a more tenacious grip upon the surface at this time.

It is also a feature of the invention to provide a very novel arrangement of parts, embodying an under frame, which is pivoted at its forward end to the corresponding end of the tractor, and has adjustable connection at its opposite end with the rear end of the tractor frame.

Other features and advantages of the invention will become apparent during the following description and drawings.

In the accompanying drawing, forming a part of this application, and in which like numerals are employed to designate like parts throughout the same:

Figure 1 represents a side elevation of a conventional form of tractor equipped with a draw bar structure constructed in accordance with the present invention.

Figure 2 is an enlarged top plan view of the improved draw bar structure detached.

Figure 3 is a rear fragmentary elevation of Figure 1.

In the drawings, T designates generally one of the conventional forms of tractors including the usual traction wheels W, the chassis or frame F, control cable C, and pivoted lever L with which it co-acts. Other details are shown, but these need not necessarily be mentioned.

Although the draw bar could be constructed otherwise, I propose to provide an under frame 1, that is, a frame which is adapted to underlie the frame F of the tractor. The draw bar frame is made up of a pair of parallel transversely spaced angle irons 2. The forward ends of these angle irons are next turned, as indicated at 3, and are pivotally connected to depending ears or the like 4, on the under side of the front cross bar of the tractor frame. The rear ends of the angle iron are disposed in parallelism with the corresponding end of the frame F, and extend a suitable distance beyond the same. The ends thereof are connected by a transverse connecting bar 5. The bar 5 may be provided with a series of longitudinally spaced apertures to afford a means for hitching a trailer onto the same. Also connected with the longitudinal bars 2 are transverse brace bars 6, disposed inwardly of the ends of the longitudinal bars. To further reinforce the structure, I employ intersecting and diagonally disposed braces 7. Opposite the ends of the rear brace bar 6 and connected to the longitudinal side bars in any appropriate manner are horizontal bearing brackets or ears 8, in which the standards 9 of small caster wheels 10 journal. The caster wheels are independently movable with respect to each other. for the purpose of connecting the rear end portions of the frame to the corresponding end of the traction frame, I provide clevices which are preferably in the form of U-shaped straps 11, pivotally connected at their upper ends to rearwardly extending ears 12 on the frame F. The arms of the straps are provided with oppositely disposed apertures for the passage of bolts 13, and the side bars 2 of the underframings are adapted to be confined between these bolts as seen in Figure 1. With this arrangement, it is obvious that the rear end of the underframe may be adjusted toward and from the tractor body to vary the action of the draw bar.

With the arrangement shown and described, it is obvious that when the tractor is making an up grade, the load will be transmitted through the draw-bar structure to the pivotal connection at the forward end of the same with the chassis of the tractor. Consequently, the body of the tractor at its forward end will be subjected to a downward pull, placing a corresponding thrust upon the traction wheels for affording a more effective traction at this time.

Now, assuming that the tractor is moving on a down grade, the tendency of the trailer (not shown) to overrun the tractor will exert a forward thrust upon the draw bar structure and the upturned ends thereof will tend to rock the rear end of the tractor downwardly, which, through the movement of the strap 11, will exert a downward thrust upon the caster wheels 10. This will cause an added pressure upon the caster wheels, thereby increasing the traction. Desiring to change the action of the draw bar, this may be done by adjusting the same toward or away from the rear end of the traction frame, through the medium of the removable bolts and straps already described.

Upon considering the foregoing description in conjunction with the drawing, a clear understanding of the invention will doubtless be had. For this reason I do not deem it necessary to incorporate a more lengthy description.

While I have shown and described the preferred embodiment of the invention, I wish it to be understood that minor changes, such as come within the scope of the adjoined claims may be resorted to, if desired.

I claim:

1. A draw bar structure comprising a frame having the side bars of its forward end upturned and adapted to be pivotally connected with the frame of the tractor, independently movable casters carried by the rear ends of the side bars of the frame, and means for adjustably connecting the rear end portion of the frame to the corresponding end of the tractor.

2. A draw bar structure comprising an under frame including longitudinal side bars connected together by braces interposed therebetween, the forward ends of said side bars being upturned, brackets carried by the rear end portions of said side bars, casters including standards journalled in bearing openings in said brackets, apertured hitching bars carried by said side bar, a pair of U-shaped straps for association with said side bars, the arms of said straps being apertured, and bolts for selective passage through the apertures in said arms.

In testimony whereof I affix my signature.

ELMER E. WATERMAN.